G. W. HAHN.
HORSE COLLAR.
APPLICATION FILED DEC. 5, 1907.
931,862.
Patented Aug. 24, 1909.
2 SHEETS—SHEET 1.
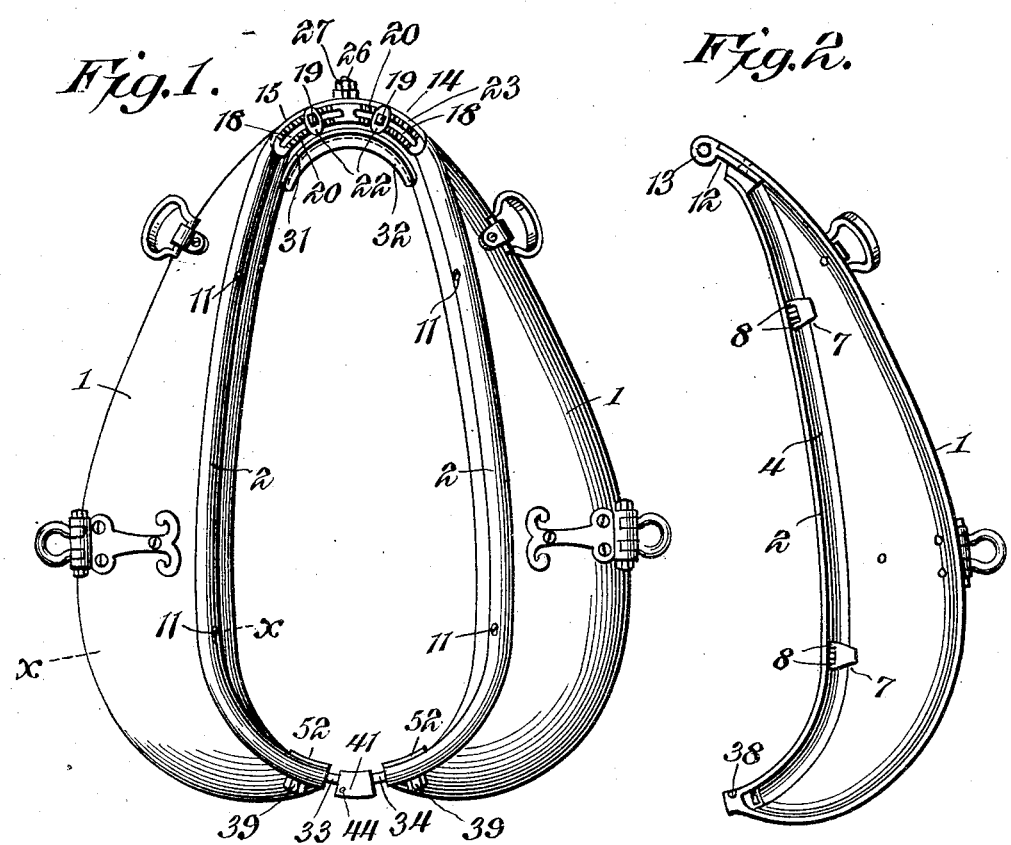
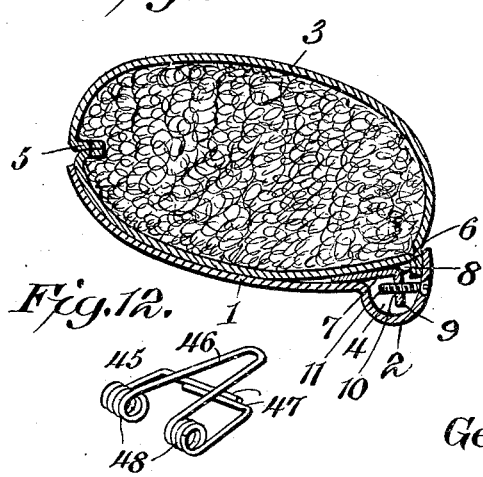
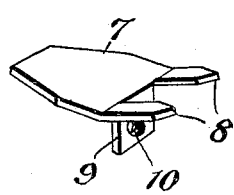
George W. Hahn, Inventor,
Witnesses
Howard D. Orr.
H. F. Riley
By E. G. Siggers
Attorney

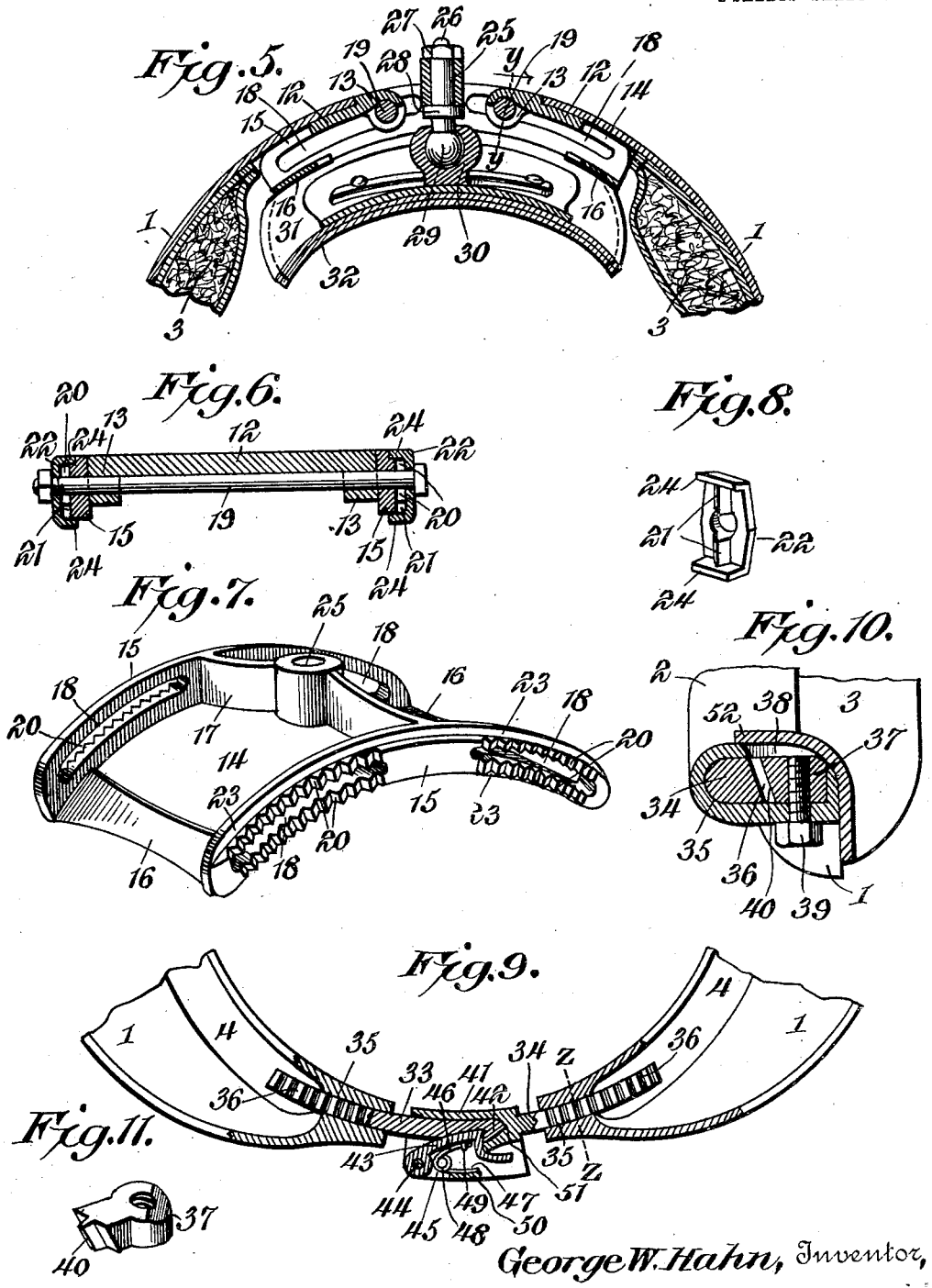

UNITED STATES PATENT OFFICE.

GEORGE W. HAHN, OF INDIANAPOLIS, INDIANA.

HORSE-COLLAR.

931,862.

Specification of Letters Patent. Patented Aug. 24, 1909.

Application filed December 5, 1907. Serial No. 405,274.

*To all whom it may concern:*

Be it known that I, GEORGE W. HAHN, a citizen of the United States, residing at Indianapolis, in the county of Marion and State of Indiana, have invented a new and useful Horse-Collar, of which the following is a specification.

The invention relates to improvements in horse collars.

The object of the present invention is to improve the construction of horse collars, and to increase their strength, durability and efficiency and to enable the same to be cheaply manufactured and assembled.

A further object of the invention is to provide a horse collar of this character, adapted to be easily opened and closed and capable of ready adjustment to fit the neck of the animal to which it is applied.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is an elevation of a horse collar, constructed in accordance with this invention. Fig. 2 is a detail view of one of the metallic side plates. Fig. 3 is a transverse sectional view on the line $x$—$x$ of Fig. 1. Fig. 4 is a detail perspective view of one of the side clamps. Fig. 5 is an enlarged sectional view of the top of the horse collar, taken longitudinally of the adjustable connection. Fig. 6 is a detail sectional view on the line $y$—$y$ of Fig. 5. Fig. 7 is a detail perspective view of the adjustable top connection. Fig. 8 is a detail perspective view of one of the adjustable clamping plates for engaging the top connection. Fig. 9 is an enlarged sectional view of the bottom of the horse collar, taken longitudinally of the collar fastener. Fig. 10 is a detail sectional view on the line $z$—$z$ of Fig. 9. Fig. 11 is a detail view, illustrating the construction of the dogs or members for engaging the bars or members of the collar fastener. Fig. 12 is a detail perspective view of the spring of the collar fastener.

Like numerals of reference designate corresponding parts in all the figures of the drawings.

1—1 designate two thin metallic sides, forming a complete front for the horse collar and tapering upwardly and downwardly from an intermediate point, and having their lower ends curved inwardly toward each other, as clearly illustrated in Fig. 1 of the drawings. The upper ends of the metallic sides are arranged at an inclination, being curved inwardly and upwardly, as shown. The body portion of each metallic side is curved transversely to form an outer convex and an inner concave face, and it is provided at its inner edge with an enlarged longitudinal bead 2. The concave inner face of the body portion of the metallic side conforms to the configuration of and snugly receives a complete side pad 3, as clearly illustrated in Fig. 3 of the drawings. The inner longitudinal bead 2, which is approximately U-shaped in cross section, conforms to the curvature of the collar, and it projects outwardly or forwardly beyond the front face of the inner or front roll of the body portion, and presents exteriorly the appearance of an ordinary horse collar. It provides an inner longitudinal groove 4, and it stiffens and strengthens the metallic sides and thereby enables the same to be either stamped from sheet metal, or molded from aluminum, or other suitable material.

The pads 3, which are preferably constructed of leather, consist of inner and outer walls stitched together at the edges and stuffed with hair or other suitable material, but they may be constructed in any other preferred manner, as will be readily understood. The stitched edges 5 at the outer edges of the metallic sides are turned in to enable the pad to present a smooth exterior surface, and the stitched edges 6 at the inner portion of the metallic sides, project from the pad and extend into the bead 2, and fit against the outer wall thereof, as clearly shown in Fig. 3. These stitched edges are firmly secured against such wall of the bead by means of a plurality of clamps 7, consisting of metallic plates, disposed transversely of the groove 4 and having their inner ends fitted against the concave inner face of the body portion of the metallic sides and provided at their outer ends with pointed jaws 8, spaced apart and adapted to engage and be partially embedded in the stitched edges 6 of the pad. The outer end of the plate is split at opposite sides of the median line and the intermediate partially severed portion is bent at an angle at the spaced jaws 8 to provide a lug 9. The lug 9 has a threaded opening 10, and is engaged by a screw 11, piercing the outer wall of the bead 2 and adapted to be turned by a screw driver, or other tool for operating the clamp 7 to engage the jaws 8 with the projecting stitched edges, and to disengage them therefrom. The head of the screw is countersunk in an opening of the bead 2 and the lugs of the clamps are arranged within the groove 4, so that the means for securing the pad to the inner face of the metallic side does not prevent the pad from fitting snugly against the concave face of the metallic side. The clamps firmly secure the pad to the metallic sides, and enable the parts to be quickly assembled and readily separated when it is necessary to repair a pad, or supply a new one.

The metallic sides are equipped at their upper ends with hinge elements 12, having transversely alined eyes 13 and provided with attached portions, which are riveted or otherwise secured to the upper ends of the metallic sides. The hinge elements may, however, be formed integral with the metallic sides, when the latter are molded from aluminum, or other material. The eyes of the metallic sides are pivotally and adjustably secured to an arcuate top connecting piece 14, composed of spaced sides 15, connected by transverse ends 16 and a central supporting member 17. The sides are curved or arched, and are provided with longitudinal slots 18, through which pass pivot bolts 19, which are also arranged in the eyes 13 of the metallic sides. The bolts 19 form pivots or pintles for hinging the metallic sides to the top connecting piece to permit the said sides to swing toward and from each other for opening and closing the horse collar. The sides are also provided with teeth 20, located at opposite sides of the slots 18 and projecting from the outer faces of the sides 15 of the top connecting piece. The teeth 20 are tapered, and form intervening inwardly tapered recesses or notches to receive tapering teeth 21 of the clamping plates 22. The clamping plates 22, which are arranged on the bolts 19, are provided with central openings to receive the bolts, and the teeth 21 are located at opposite sides of the opening for engaging the teeth 20 of the sides 15 of the top connecting piece, whereby the bolts are adjustably secured to the said connecting piece. The teeth 20 are formed in longitudinal flanges, projecting from the outer faces of the sides 15 and forming opposite longitudinal recesses 23, which are arranged to receive end flanges 24 of the clamping plates, whereby the latter are engaged with the sides 15 and are held against rotary movement. By adjusting the pivot or pintle bolts inwardly and outwardly, the opening of the horse collar may be varied, and the collar may be adjusted to fit the neck of the animal to which it is to be applied. The ends 16 are located at the lower edges of the sides 15, which receive the front ends of the metallic sides 1 between them.

The intermediate transverse supporting bar or member of the top connecting piece is provided with an opening 25 to receive a bolt 26, having a threaded upper end for the reception of a nut 27 and provided at an intermediate point with a collar or flange 28 for engaging the supporting bar or member 17 at the lower edge thereof. The bolt depends from the supporting bar or member, and is provided with a ball-shaped head 29, which fits within a socket 30 of a metallic neck yoke pad 31. The metallic neck yoke pad 31 is provided with a lining 32 of leather, or other suitable material, and it is adapted to readily adjust itself to the neck of an animal to prevent the latter from being chafed or rubbed by the collar.

The sides of the horse collar are secured together by means of a fastener, comprising two bars or members 33 and 34, detachably secured together by the means hereinafter described, and adjustably secured to the lower ends of the metallic sides of the horse collar. The lower ends of the sides are provided with longitudinal openings 35, forming sockets for the bars or members 33 and 34, which are curved longitudinally, as clearly shown in Fig. 9, to conform to the curvature of the lower ends of the metallic sides. The bars or members are provided at their rear edges with teeth 36, and they are adjustably secured to the metallic sides by means of dogs 37, consisting of plates arranged in transverse recesses 38 of the metallic sides and secured by screws 39, piercing the metallic sides and engaging threaded perforations of the dogs. Each dog is provided at its engaging end with a tooth 40, which engages the teeth 36 of the bars or members. The recess 38 snugly receives the dog 37, which is held against rotary movement by the walls of the recess. The teeth of the bars or members 33 and 34 are set at an angle and the dogs are transversely tapered and have their teeth set at an angle, as clearly illustrated in Fig. 10 of the drawings, whereby the dogs are interlocked with and are adapted to clamp the bars or members 33 and 34. By means of the adjustable connection between the bars or members and the metallic sides, the sides of the horse collar are adapted to be adjusted inwardly or outwardly to vary the distance between them, and the upper and lower adjustments of the sides of the collar enable the latter to be readily fitted to the neck of an animal.

The bar or member 34 is equipped with a casing 41, which receives the other connecting bar or member 33. The connecting bar or member 33 is provided at its engaging end with a head 42, having a shoulder formed by recessing the lower edge of the bar or member and engaged by a pawl or dog 43. The pawl or dog is pivoted between the sides of the casing by a rivet 44, or other suitable fastening device, and it is maintained in engagement with the bar or member 33 by means of a spring 45. The spring is composed of an intermediate loop 46, end arms 47 and connecting coils 48. The link is secured to the pawl or dog by a suitable fastening device 49, and the end arms, which are L-shaped, engage a transverse bar or member 50 of the casing 41. The bar or member of the casing 41 is located at the lower edges of the sides thereof, and the spring is interposed between the said bar or member and the pawl or dog. The free end of the pawl or dog is provided with a projecting lip or portion, adapted to be readily engaged by the thumb or finger for swinging the pawl or dog out of engagement with the bar or member 33 to release the same. The head of the bar or member 33 is received in a recess or seat 51 of the casing 41, and the parts are adapted to lock automatically when the bar or member 33 is inserted in the casing, when closing the horse collar. The recess or seat 51 is adapted to relieve the pawl or dog of torsional strain. The side pads of the collar are provided at their lower ends with flaps or extensions 52, which cover the dogs 37 and the screws 39.

Having thus fully described my invention, what I claim as new and desire to secure by Letters Patent, is:—

1. A horse collar including a side pad, a thin metallic side forming the front of the horse collar and consisting of a transversely curved body portion presenting a continuous concave face to the front of the pad and being of a width less than the width of the said pad, and an inner longitudinal stiffening bead approximately U-shaped in cross section and completing the width of the said side and presenting an inner longitudinal groove across which the collar extends and into which a portion thereof projects, said bead also forming a front roll for the collar, and a clamp arranged exteriorly of the pad and located within the groove and carried solely by the bead and engaging the projecting portion of the collar to clamp the same.

2. A horse collar including a side pad provided with a seam projecting exteriorly of the pad, a thin metallic side forming the front of the horse collar and consisting of a transversely curved body portion presenting a continuous concave face to the front of the pad and being of a width less than the width of the said pad, and an inner longitudinal stiffening bead approximately U-shaped in cross section and completing the width of the said side and presenting an inner longitudinal groove, which receives the exteriorly projecting seam and across which the collar extends, said bead also forming a front roll for the collar, and fastening means located within the said groove and coöperating with one of the walls thereof to clamp the projecting seam.

3. A horse collar including a pad, a thin metallic side conforming to and fitting closely against the front of the horse collar and provided at one edge with a longitudinal bead constituting an inner groove and forming a front roll for the collar, a clamp located exteriorly of the pad and extending across the groove and movable transversely of the same and coöperating with the outer wall thereof to grip the pad, and adjusting means for the clamp located exteriorly of the pad and mounted on the metallic side.

4. A horse collar comprising thin metallic sides forming the front of the horse collar and provided with inner enlarged longitudinal beads forming front rolls for the collar and also providing inner grooves, side pads, clamps consisting of plates disposed transversely of the grooves and provided with spaced jaws for engaging the side pads and each having a lug extending into the groove, and an exteriorly operable screw piercing the said bead and connected with the lug of the clamps for operating the latter.

5. A horse collar comprising sides provided at their upper ends with eyes, a top connecting piece provided with longitudinal slots, and pintles passing through the eyes of the sides of the horse collar and adjustably secured in the slots of the top connecting piece and hinging the former to the latter.

6. A horse collar comprising sides having eyes, a top connecting piece provided with longitudinal slots and having teeth located at the slots, pintles passing through the eyes of the sides of the horse collar and adjustably arranged in the slots of the top connecting piece, and means carried by the pintles and interlocking with the said teeth to secure the sides in their adjustment.

7. A horse collar comprising sides having eyes, a top connecting piece provided with longitudinal slots and having teeth located at the slots, pintles arranged in the slots and passing through the eyes of the sides of the horse collar, and clamping plates mounted on the pintles and provided with teeth for engaging those of the top connecting piece.

8. A horse collar comprising sides having eyes, a top connecting piece provided with longitudinal slots and having teeth extending longitudinally of the slots, said top connecting piece being also provided with longitudinal recesses, pintles passing through the eyes and arranged in the slots, and clamping plates mounted on the pintles and provided with teeth for engaging those of the top connecting piece and having flanges arranged in the said recesses.

9. A horse collar comprising sides provided at their upper ends with eyes, a top connecting piece composed of spaced sides receiving the upper ends of the sides of the horse collar between them, ends connecting the sides of the top connecting piece, and an intermediate supporting bar or member also connecting the sides of the top connecting piece and adapted to carry a neck yoke pad.

10. A horse collar comprising sides provided at their lower ends with openings and having recesses communicating therewith, bars or members adjustable in the said openings and provided with means for securing them together, and tapered dogs rigidly mounted in the said recesses and engaging the said bars or members at the side edges thereof and clamping the same in their adjustment.

11. A horse collar comprising sides having openings and provided with recesses communicating therewith, bars or members slidable in the openings and having means for detachably fastening them together and provided at their side edges with teeth set at an angle, and tapered dogs arranged in the recesses and provided with teeth set at an angle and engaging those of the bars or members, and fastening devices mounted on the sides and rigidly retaining the dogs in engagement with the said bars or members.

12. A horse collar comprising thin metallic sides forming the front of the horse collar and provided with inner enlarged longitudinal beads forming inner grooves, side pads, and clamps extending across the grooves and slidably supported at one side of the bead and provided with means coöperating with the other side of the bead to clamp the pad.

13. A horse collar comprising thin metallic sides forming the front of the horse collar and provided with inner enlarged longitudinal beads forming inner grooves, side pads, and clamps extending across the grooves and slidably supported at one side of the bead and provided with spaced jaws coöperating with the other side of the bead to clamp the pad.

14. A horse collar comprising thin metallic sides forming the front of the horse collar and provided with inner enlarged longitudinal beads forming inner grooves, side pads, and clamps extending across the grooves and slidably supported at one side of the bead and provided with spaced jaws coöperating with the other side of the bead to clamp the pads, said clamps being also provided between the jaws with lugs extending into the groove, and means located exteriorly of the side pads and connected with the lugs for operating the clamps.

In testimony, that I claim the foregoing as my own, I have hereto affixed my signature in the presence of two witnesses.

GEORGE W. HAHN.

Witnesses:
 GUST KRUEGER,
 DAVID E. SOWER.